C. H. STAHL.
LOCK.
APPLICATION FILED JUNE 2, 1914.

1,137,363.

Patented Apr. 27, 1915.

Witnesses:-
Hyperion Barry.
F. George Barry

Inventor:
Charles H. Stahl
by his attorneys
Brown & Seward

UNITED STATES PATENT OFFICE.

CHARLES H. STAHL, OF NEW HAVEN, CONNECTICUT, ASSIGNOR TO THE PFLEGHAR HARDWARE SPECIALTY CO., OF NEW HAVEN, CONNECTICUT, A CORPORATION OF CONNECTICUT.

LOCK.

1,137,363.    Specification of Letters Patent.    Patented Apr. 27, 1915.

Application filed June 2, 1914.    Serial No. 842,391.

*To all whom it may concern:*

Be it known that I, CHARLES H. STAHL, a citizen of the United States, and resident of New Haven, in the county of New Haven and State of Connecticut, have invented a new and useful Improvement in Locks, of which the following is a specification.

This invention relates to locks for automatically securing pivoted parts in various angular positions relative to each other, with the object in view of providing a device of this character which is simple, compact, neat in appearance, and positive in action.

The device is particularly adapted for use in connection with the wind shields of motor vehicles, for locking the upper section of the wind shield in various positions with respect to the lower section, which latter is generally fixed; or for locking a single section wind shield in various positions with respect to the dash.

Another object is to provide certain improvements in the form, construction and arrangement of the several parts, whereby the above named objects may be effectively carried out.

A practical embodiment of my invention is represented in the accompanying drawings, in which—

Figure 1:
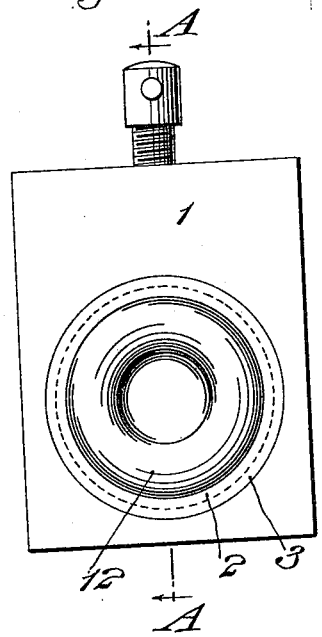
Figure 2:
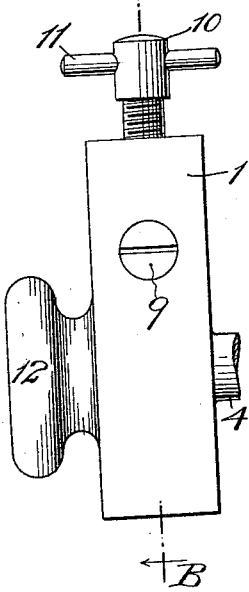
Figure 3:
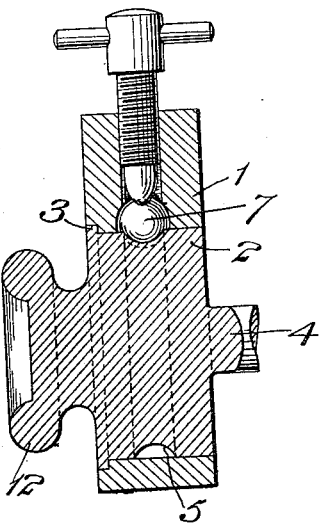
Figure 4:
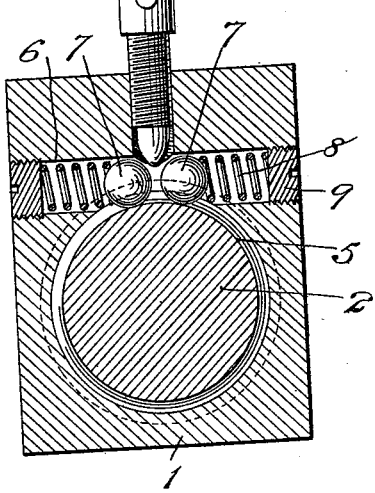
Figure 5:
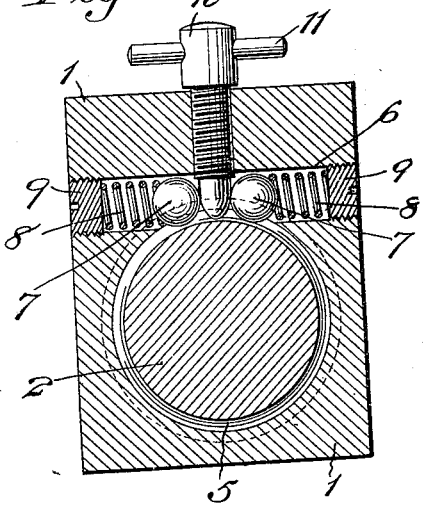

Figure 1 represents a face view of the device, Fig. 2 represents a view at right angles to Fig. 1, Fig. 3 represents a section taken in the plane of the line A—A of Fig. 1, looking in the direction of the arrows, Fig. 4 represents a view taken in the plane of the line B—B of Fig. 2, looking in the direction of the arrows, and Fig. 5 represents a section on the same line as Fig. 4 but with the device in unlocked position.

The lock comprises an outer member 1 which is conventionally shown here as of rectangular shape; but which may be fashioned for connection with any part, such, for instance, as the stanchion which supports the lower section of a wind shield.

The outer member 1 has a circular opening therethrough which is arranged to receive, with a bearing fit, the inner member 2, whereby the members 1 and 2 are fitted to oscillate in a rotary direction with respect to each other, and more specifically the inner member 2 is adapted to move in a rotary direction within the outer member 1.

The member 2 is further provided with a shoulder 3 adapted to engage a corresponding recess in the member 1 for preventing the member 2 from moving through the member 1 in an inward direction.

The member 2 has a projection 4 thereon which may be fastened in a desired manner to the other section of the wind shield or other part in connection with which the lock is used.

The inner member 2 has a centrally disposed peripheral groove 5 which is approximately semi-circular in cross section; while the outer member 1 has a straight transversely extending passage 6 therethrough, which is arranged so as to lie substantially tangentially with respect to the periphery of the inner member 2. It will be noted, however, that the inner wall of the passage 6 lies somewhat nearer to the center of the inner member 2 than does the bottom of the groove 5.

A pair of balls 7, of approximately the same diameter as the passage 6, and having a contour substantially corresponding with that of the groove 5, are disposed within the passage 6 and arranged to rest in the groove 5. These balls 7 are yieldingly forced toward each other by coil springs 8, which are confined within the passage 6 by means of screw threaded followers 9, as clearly shown in Figs. 4 and 5.

An adjustable wedge 10 is screw threaded into the upper portion of the member 1, and lies in a direction substantially at right angles to the passage 6, with which passage it communicates at substantially the central portion thereof. This wedge 10 has a handle 11 for convenient manual operation thereof; while the inner member 2 also has a knob 12 for turning it.

In operation, when the device is assembled as shown in Fig. 4, the balls 7 are pressed toward each other until they are cramped between the upper wall of the passage 6 and the bottom of the groove 5. This cramping action is due to the fact that the diameter of the balls is greater than the distance from the upper wall of the passage 6 and bottom of the groove 5 at the point where the said wall and groove are closest to each other. In this position, the inner member 2 is locked against rotary oscillation within the outer member 1 by reason of the fact that one of the balls 7, being cramped against further inward movement, will positively prevent a rotary movement in a direction tending to force the said ball inwardly, while the other ball 7 will act contrariwise.

When it is desired to change the relative position of the two members, the adjustable wedge 10 is screwed down until it separates the balls 7, as is clearly shown in Fig. 5. In this position the balls still rest in the groove 5, but they do not impinge against the walls of the passage 6, and consequently the inner member 2 may be turned within the outer member 1.

When the desired angular adjustment of the members has been obtained, it is only necessary to unscrew the wedge 10 so as to withdraw it to its inoperative position, indicated in Fig. 4, at which point the springs 8 will automatically force the balls 7 inwardly to the position shown in Fig. 4, and thereby positively lock the device.

It will be understood that various changes may be resorted to in the form, construction and arrangement of the several parts without departing from the spirit and scope of my invention; hence I do not intend to be limited to specific details herein shown and described except as they may be set forth in the claims.

What I claim is:—

1. A locking device of the class described comprising inner and outer members fitted to oscillate relatively to each other, a pair of balls arranged to rest on the periphery of the inner member, automatic means to force the balls toward each other and into engagement with both members, and means for forcing said balls away from each other and out of engagement with both members.

2. A locking device of the class described, comprising a circular inner member, an outer member in which the inner member is fitted to oscillate, a pair of balls adapted to rest on the periphery of the inner member, a transverse passage in the outer member substantially tangential to the inner member, means located in said passage to force the balls into engagement with the two members, and means disposed at an angle to said passage for forcing the balls out of said engagement.

3. A locking device of the class described comprising a circular inner member, an outer member in which the inner member is fitted to oscillate, a peripheral groove on the inner member, a pair of balls adapted to rest in said groove, a transverse passage in the outer member substantially tangential to the inner member, means to force the balls toward each other and into engagement with the bottom of the groove and the top of the passage, and means to force the balls away from each other and out of engagement with the bottom of the groove and top of the passage.

4. A locking device of the class described comprising a circular inner member, an outer member in which the inner member is fitted to oscillate, a peripheral groove on the inner member, a pair of balls adapted to rest in said groove, a transverse passage in the outer member substantially tangential to the inner member, automatic means to force the balls toward each other and into engagement with the bottom of the groove and the top of the passage, and means to force the balls away from each other and out of engagement with the bottom of the groove and top of the passage.

5. A locking device of the class described comprising a circular inner member, an outer member in which the inner member is fitted to oscillate, a peripheral groove on the inner member, a transverse passage in the outer member substantially tangential to the inner member, but with its bottom wall lying closer to the center of the inner member than does the bottom of the groove, a pair of balls fitted to rest in the groove, said balls being greater in diameter than the shortest distance between the bottom of the groove and the top of the passage, means to force the balls into engagement with the bottom of the groove and the top of the passage, and means to force the balls out of engagement with the bottom of the groove and the top of the passage.

6. A locking device of the class described comprising a circular inner member, an outer member in which the inner member is fitted to oscillate, a peripheral groove on the inner member, a transverse passage in the outer member substantially tangential to the inner member, but with its bottom wall lying closer to the center of the inner member than does the bottom of the groove, a pair of balls fitted to rest in the groove, said balls being greater in diameter than the shortest distance between the bottom of the groove and the top of the passage, means to force said balls toward each other and into engagement with the bottom of the groove and the top of the passage.

7. A locking device of the class described comprising a circular inner member, an outer member in which the inner member is fitted to oscillate, a peripheral groove on the inner member, a transverse passage in the outer member substantially tangential to the inner member, but with its bottom wall lying closer to the center of the inner member than does the bottom of the groove, a pair of balls fitted to rest in the groove, said balls being greater in diameter than the shortest distance between the bottom of the groove and the top of the passage, means to force said balls toward each other and into engagement with the bottom of the groove and the top of the passage, and means to force said balls away from each other and out of engagement with the bottom of the groove and the top of the passage.

8. A locking device of the class described comprising a circular inner member, an outer member in which the inner member is fitted to oscillate, a peripheral groove on the inner member, a transverse passage in the outer member substantially tangential to the inner member, but with its bottom wall lying closer to the center of the inner member than does the bottom of the groove, a pair of balls fitted to rest in the groove, said balls being greater in diameter than the shortest distance between the bottom of the groove and the top of the passage, automatic means for forcing said balls toward each other and into engagement with the bottom of the groove and the top of the passage, and means to force said balls away from each other and out of engagement with the bottom of the groove and the top of the passage.

9. A locking device of the class described comprising a circular inner member, an outer member in which the inner member is fitted to oscillate, a peripheral groove on the inner member, a transverse passage in the outer member substantially tangential to the inner member, but with its bottom wall lying closer to the center of the inner member than does the bottom of the groove, a pair of balls fitted to rest in the groove, said balls being greater in diameter than the shortest distance between the bottom of the groove and the top of the passage, automatic means for yieldingly forcing the balls toward each other and into engagement with the bottom of the groove and the top of the passage, and means to force said balls away from each other and out of engagement with the bottom of the groove and top of the passage.

In testimony, that I claim the foregoing as my invention, I have signed my name in presence of two witnesses, this 29th day of May 1914.

CHARLES H. STAHL.

Witnesses:
CARL F. STAHL,
WILLIAM G. DAVIDSON.

Copies of this patent may be obtained for five cents each, by addressing the "Commissioner of Patents, Washington, D. C."